INVENTORS
STEVEN S. DAVIS
GEORGE SLAJCHERT
BY Robert W. Habel
ATTORNEY

Feb. 11, 1969  S. S. DAVIS ET AL  3,426,908
HORIZONTAL VACUUM FILTER
Original Filed Aug. 14, 1964
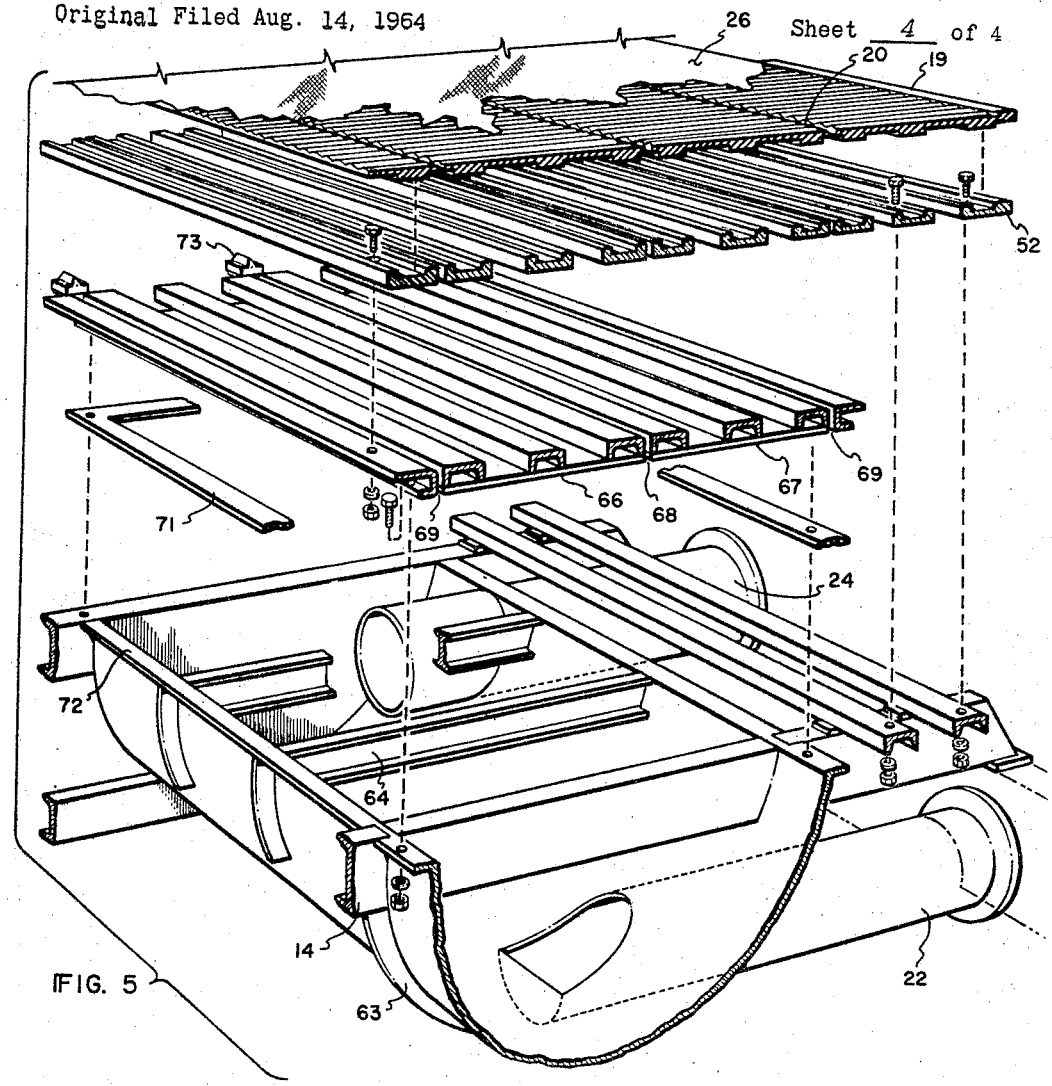
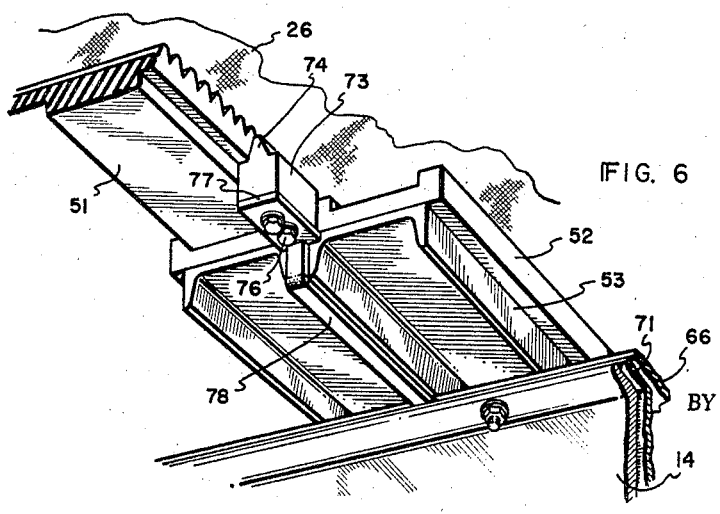
INVENTORS
STEVEN S. DAVIS
GEORGE SLAJCHERT
BY Robert W. Habel
ATTORNEY

United States Patent Office 3,426,908
Patented Feb. 11, 1969

3,426,908
HORIZONTAL VACUUM FILTER
Steven S. Davis, Bountiful, Utah, and George Slajchert, San Mateo, Calif., assignors to The Eimco Corporation, Salt Lake City, Utah, a corporation of Delaware
Continuation of application Ser. No. 389,577, Aug. 14, 1964. This application Sept. 1, 1967, Ser. No. 665,182
U.S. Cl. 210—401                                            1 Claim
Int. Cl. B01d 33/04

ABSTRACT OF THE DISCLOSURE

Vacuum filter with a single filter medium supported on and overlying a plurality of liquid impervious endless drainage belts arranged with their upper flights moving in a horizontal plane. Longitudinal ribs on the underside of the belt are guided in grooves in the top of a common vacuum pan to maintain a fixed space between adjacent belts and there are openings into the vacuum pan through the bottom of the groove for filtrate drainage. Seals operative between adjacent belts and the groove limit vacuum loss at the ends of the grooves. A cascading weir type feed system extends transversely of the filter.

---

This is a continuation of applicants' copending application Ser. No. 389,577, filed Aug. 14, 1964, and now abandoned.

This invention relates to horizontal vacuum filters of the type having an endless filter media web and endless drainage belt for supporting said web trained to pass around spaced apart rolls for rotation therewith, and a vacuum pan interposed between the rolls and adjacent the underside of the belt for drawing filtrate through the web to discharge.

Such filters have certain inherent advantages over more conventional drum or disc type filters in that filtration occurs only on a horizontal plane thus eliminating the high vacuum requirements which are necessary to hold the cake on the web as when it is formed against the force of gravity.

However, heretofore horizontal vacuum filters have been limited in size because the dimensions of the drainage belt must be kept to a minimum in order to withstand the forces exerted thereon by the large rolls and vacuum pan, thereby greatly reducing the desirability of such filters in a number of applications. It is also difficult to fabricate extra wide belts due to the unusual mold requirements. Moreover, drainage has not been effective as desired with known horizontal filters since the withdrawal conduits in the drainage belt were not always adequate to handle the amounts of filtrate collected under the web and increasing the size of the conduits to increase flow volume unduly reducing the strength of the belt.

A primary object of this invention is to provide a horizontal vacuum filter construction that may be sized as large as necessary wihout overloading the drainage belt.

An important object of this invention is to provide a horizontal vacuum filter that is capable of handling a high volume of feed while effecting rapid filtrate drainage.

A realted object is to provide a novel drainage belt assembly and tracking means for horizontal vacuum filters that may be used in attaining the foregoing objects.

Another object is to provide improved ways and means for continuously effecting a seal between the vacuum pan and moving drainage belt.

Still another object is to provide a vacuum pan construction for horizontal vacuum filters enabling filtrate-air separation prior to removal from the pan.

In brief, the invention comprises a horizontal vacuum filter embodying a plurality of endless drainage belts trained to pass side by side around spaced apart rotatable rolls or drums with a small slot or gap left between adjacent edges of the belts through which filtrate drainage is effected. Vacuum pan means interposed between the drums and adjacent the underside of the belts communicate with the slot which is maintained at a constant width by a combined guide and vacuum sealing means. An overlying endless filter media web is trained to pass around and rotate with the belts.

In order that the invention may be more fully understood and carried into effect, reference is invited to the accompanying drawings which are offered by way of illustration only and not in limitation of the invention, the scope of which is defined by the appended claim rather than any description preceding them.

FIG. 5 is an exploded view, partly in section, of the vacuum pan and cover assembly, together with a portion of the belts and filter media in relation to the tracking members.

FIG. 6 is an enlarged view showing the position of one of the end seal blocks in relation to the slots between the belts.

Figure 1:
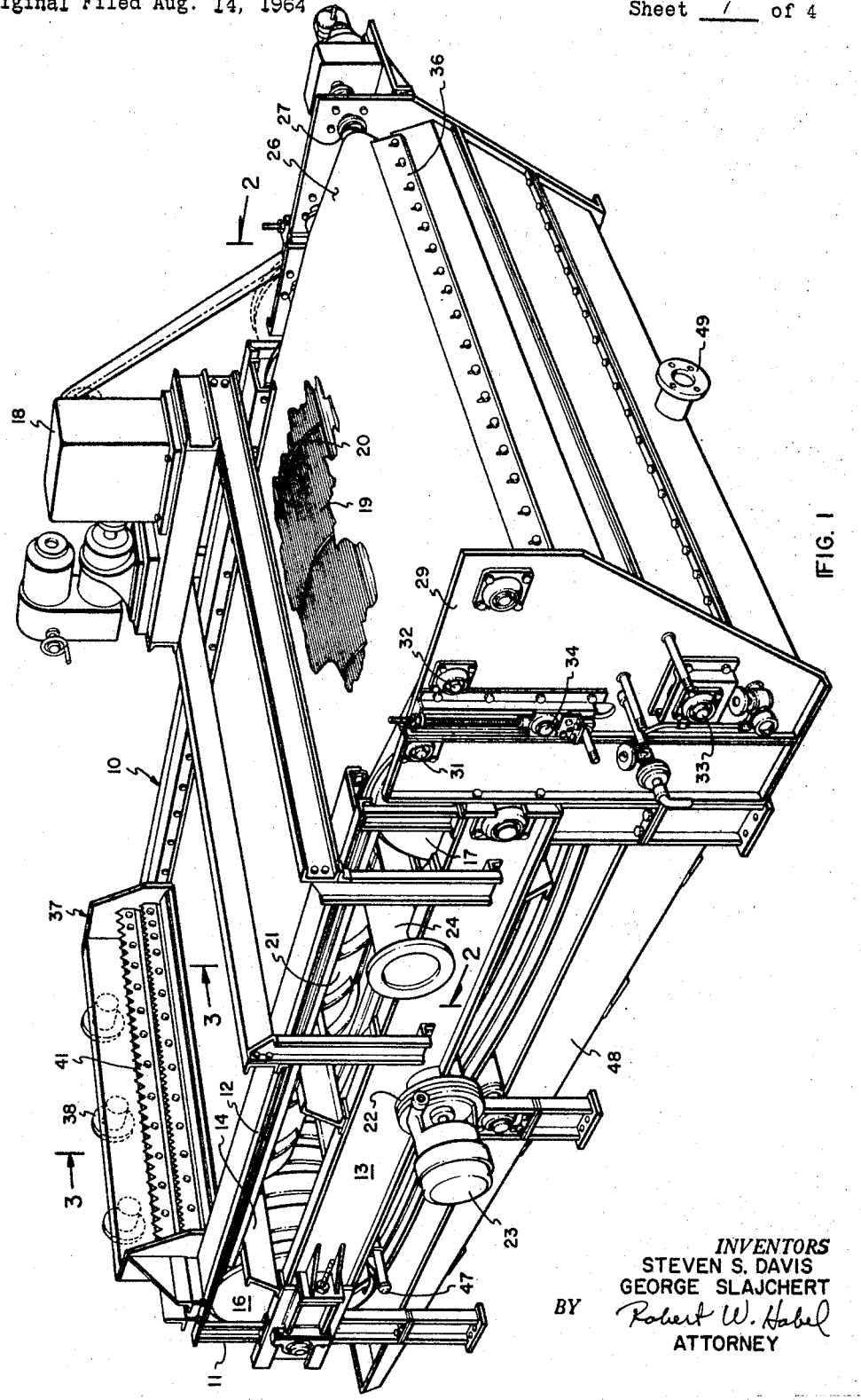
FIG. 1 is a perspective view of the horizontal belt filtering apparatus of the invention.
Figure 2:
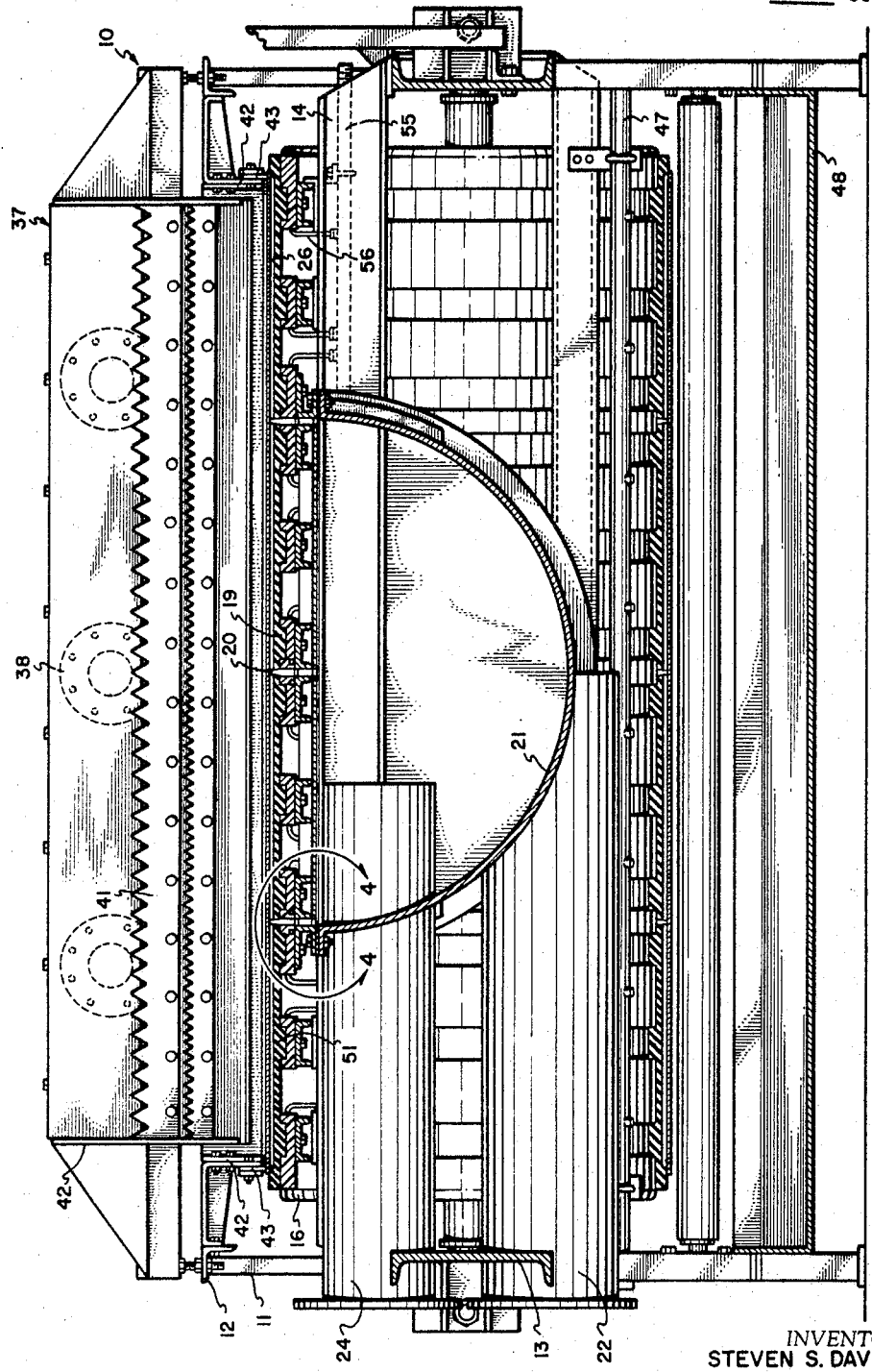
FIG. 2 is a vertical cross section view of the apparatus taken in the plane of line 2—2 of FIG. 1.

In the drawings there is shown a horizontal vacuum filter, generally designated 10, comprising a supporting frame assembly 11, having upper longitudinal members 12, lower longitudinal members 13 and cross beams 14, in which is rotatably mounted drums 16 and 17 driven by conventional drive mechanism 18. Several drainage belts 19 composed of rubber or similar flexible material are trained to pass around said drums in side by side relationship with a small slot or gap 20 left between their adjacent edges through which filtrate is withdrawn to vacuum pan 21, interposed between the drum and adjacent the underside of the belts, for eventual removal via pipe 22 by liquid pump 23. A vacuum source (not shown) is connected to pipe 24 in communication with the upper portion of the pan.

An endless filter media web 26 overlays said belts and is trained to travel with the belts and additionally to pass around discharge roller 27, spaced from drum 17, and journalled for rotation between plates 29 forming a cake discharge section. Support rollers 31 and 32 may be used if necessary and additional rollers 33 and 34 provide a web washing section before return of the web to the belts. Cake discharge is facilitated by deflecting blade 36.

Figure 3:
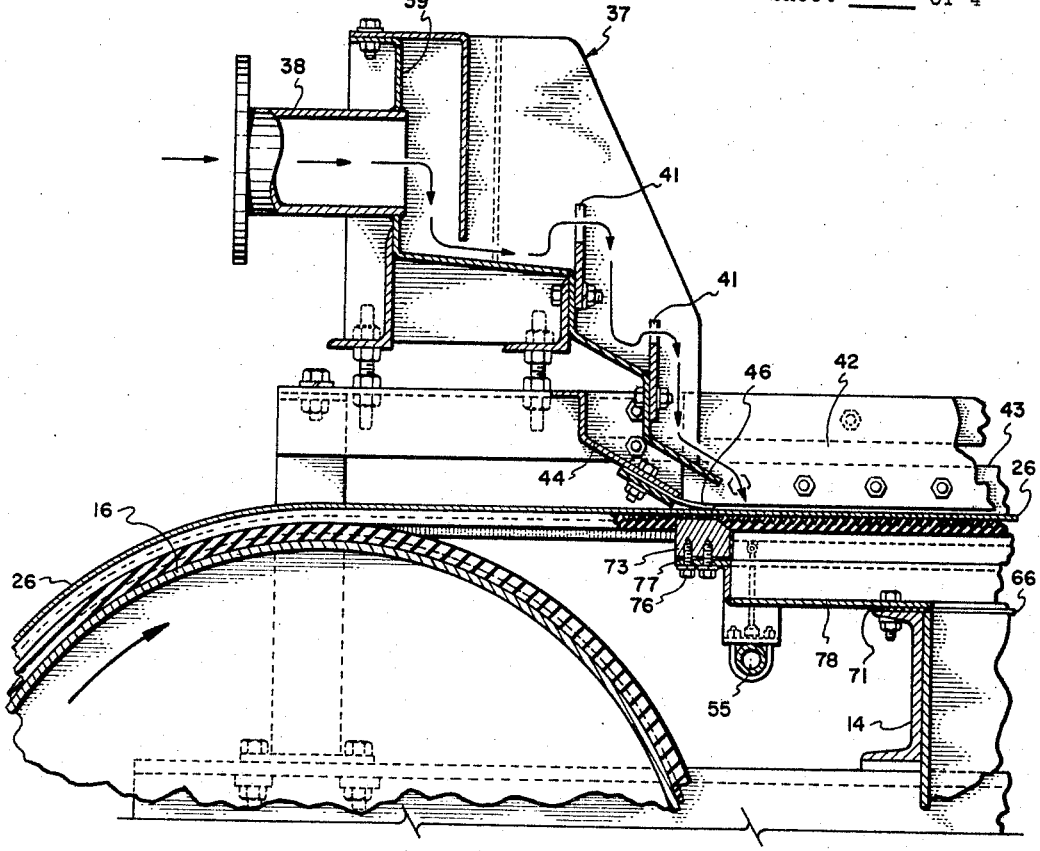
FIG. 3 is a sectional view of the weir box feed assembly and rear vacuum pan seal taken along line 3—3 of FIG. 1.

Cascade weir box 37 and integral feed conduits 38 uniformly distribute the slurry influent across the horizontal filtering section between the drums. As can be seen more clearly from the arrows in FIG. 3, influent fed through conduits 38 is deflected downwardly and initially distributed laterally by plate 39 before tumbling over and down saw toothed weirs 41.

Side dams 42 bolted to upper frame members 12 and the flexible extensions thereof 43 resting on the web hold the slurry in a filtering section. Back flow under the weir box is prevented by a lateral dam 44 and flexible squeege 46 bolted thereto engaging the web and belts as they pass under the weir box. Drips and spills from various portions of the apparatus together with belt and web wash water as from wash conduit 47 are collected in trough 48 mounted on the frame under the drums and discharged through drain 49 in the front of the trough.

As noted, a plurality of drainage belts are provided in the filter apparatus of the invention, four being shown in the illustrated embodiment. This is an important feature of the invention since it enables the apparatus to be sized to any desired dimension simply by increasing or decreasing the number of belts. The belts being relatively narrow in width do not require extra large molding apparatus nor special reinforcement techniques to be able to withstand the forces inherent in the operation of the filter.

Each belt is molded with longitudinal ribs 51 on its underside for sliding engagement in spaced track members 52 bolted to beams 53 which are mounted on the frame cross members 14. Similar tracking grooves are provided in drums 16 and 17 the surfaces of which may be formed of a resilient material such as rubber. The track members 52 may be made of any material which will provide a smooth surface for the belts to slide on. Preferably, they are molded from a synthetic polymer having a relatively low coefficient of friction such a polyethylene, polypropylene, Teflon, etc.

It is important that the belt tracking means accurately control the position of the belts since it is only by maintaining proper belt alignment that the slots 20 between the belts can be held constant assuring an even flow of filtrate from under the web and fast discharge rate. In other words, slight deviations acting to decrease or increase the slot width will result in uneven filtrate flow rates through the slots and uneven cake dewatering.

Figure 4:
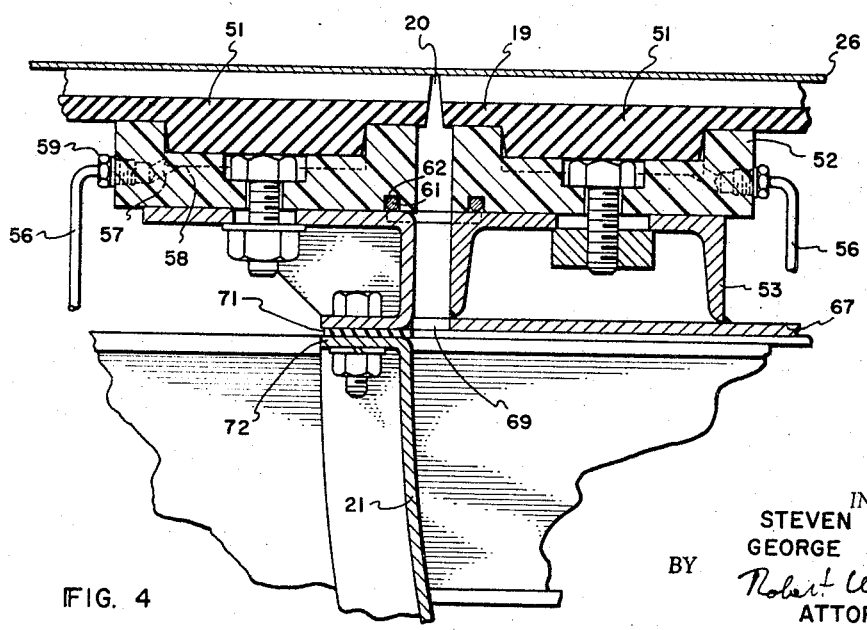
FIG. 4 is an enlarged view of a portion of FIG. 2 showing the drainage slot between the belts and detail of the guides and pan seals.

In order to reduce friction between the belts and tracking members, the area of contact is continuously lubricated. To this end there is provided main lubricant supply conduit 55 from which individual conduits 56 depend and communicate with a channel 57 and transverse slot 58 in the bottom of each track member via a suitable connector 59 as is best illustrated in FIG. 4. The slot 59 (shown in dotted lines) transmits the lubricating fluid which is introduced under suitable pressure across the bottom of the track member. In this connection, it should be noted that the side walls of ribs 51 are slightly tapered enabling lubricating fluid to pass upwardly to the horizontal bearing surfaces which act both to lubricate and seal the contact area under vacuum. For most applications, water works well as a lubricating fluid although other suitable lubricants may be employed.

In FIG. 4 it will be observed that the outside edges of track members 52 and adjacent edges of beams 53 provide an extension of slots 20 such that the slots communicate with the vacuum pan 21. Gaskets 61 held by grooves 62 in the track members provide a vacuum seal between the tracks and beams 53.

The vacuum pan embodiment illustrated in FIG. 5 provides a unique arrangement whereby air and filtrate are automatically separated within the pan itself rather than in additional separating means outside the filter as is the usual case. It will be observed that the pan is relatively deep and that separate conduits are provided for vacuum and filtrate removal. The vacuum conduit 24 communicates with only the upper portion of the pan and filtrate conduit 22 with only the lower portion. Thus, filtrate and air entering the pan through slots 20 are separated by the relative positions of the conduits, the liquid falling to the bottom and air remaining at the top. Preferably conduit 24 extends a short distance into the pan such that it does not open directly into the filtrate discharge area under slots 20 thereby reducing the chance of filtrate entering the conduit.

In view of the wide points from which filtrate is withdrawn under the belts and hence need for a rather large pan, it is constructed to withstand the high external pressures produced during application of vacuum and to this end external reinforcing ribs 63 and internal cross beams 64 are provided. The vacuum pan cover is made of two sheets 66 and 67 spaced to provide a central gap 68 and outside gaps 69 such that the sheets do not quite cover the pan. It will be seen that the gaps correspond to the slots 20 between the belts. Longitudinal beams 53 are welded or otherwise affixed along their bottom legs to the cover sheets 66 and 67 and rigidly hold the cover from collapsing. Track members 52 are bolted to beams 53 and as noted heretofore, the ribs 51 of the belts ride in the grooves thereof. The cover and pan are sealed by a suitable gasket 71 between the outer periphery of the cover and lip portion 72 of the pan.

Referring specifically to FIGS. 4 and 6, it can be seen that the ends of slots 20 are maintained continuously sealed by blocks 73 each having a tapered top portion 74 which projects from under the belts into the slot and almost to the top of the transverse ribs in the belts. Also, it will be observed that the edges of the belts are slightly tapered. This is important since it facilitates a better end seal between belts and blocks 73 without creating undue frictional stresses. The blocks 73 butt against the end of tracking members 52 covering the gap therebetween, and are mounted by means of screws 76 to a bracket piece 77 welded to or otherwise affixed to beams 53. A solid insert 78 closes the gap up to the edge of the vacuum pan cover.

From the foregoing description it will be seen that there is provided a horizontal vacuum filtering apparatus which, because of its novel multiple belt design, may be sized to any suitable dimension and is capable of fast deliquidation of difficult to filter slurries. Because vacuum is applied through relatively large slots between the belts, filtrate drainage is rapid and cake formation practically instantaneous with minimal cake moisture content. The novel vacuum pan design provides internal liquid-air separation without the need for additional apparatus and effective sealing means are provided between the belts and pan. Accurate belt tracking means enable positive control over the drainage slots between the belts and any number of belts may be employed in the apparatus.

What is claimed is:

1. Horizontal vacuum filter apparatus comprising a frame, a pair of spaced apart horizontally disposed drums mounted in said frame, a plurality of endless drainage belts trained around said drums for rotational movement therewith, said belts being spaced apart in side by side relationship on said drums with a slot between the edges of adjacent belts, the edge of each said belt adjacent another belt being angled downwardly so that said slot between adjacent belts is narrower at the top than at the bottom, longitudinal ribs in the underside of said belts, tracking means interposed between said drums and adjacent the underside of said belts having grooves generally coextensive in size and shape with said ribs in said belts, similar grooves in the peripheral surfaces of said drums, said tracking means providing an extension of the slots between said belts, a vacuum pan interposed between said drums adjacent the underside of said tracking means and in communication with said slots, said vacuum pan having a first conduit communicating with an upper portion thereof and a second conduit communicating with a lower portion thereof, sealing means for holding of vacuum in said slots comprising a block at each end of said slot and extending upwardly into the slot between said belts, means for lubricating the contact surface areas between said tracking means and said belts, an endless filter media web overlying said belts and trained to rotate therewith, and means above one end of said filter for supplying feed onto the upper surface of said filter medium, said means comprising a plurality of adjacent chambers arranged above and transverse of the path of travel of said medium, said chambers being arranged in downward descending order from an upper feed receiving chamber to a lower chamber from which feed flows onto said filter medium and each one having an overflow weir along one side.

References Cited

UNITED STATES PATENTS

| | | | |
|---|---|---|---|
| 1,793,449 | 2/1933 | Bassler | 210—400 |
| 2,101,042 | 12/1937 | Casey | 210—401 X |
| 2,314,294 | 3/1943 | Wallny | 210—401 |
| 2,377,252 | 5/1945 | Lehrecke | 210—401 |
| 2,572,869 | 10/1951 | Koonce et al. | 210—456 X |
| 2,873,028 | 2/1959 | Bried | 210—400 X |
| 2,963,161 | 12/1960 | Holland | 210—401 |

SAMIH N. ZAHARNA, *Primary Examiner.*

U.S. Cl. X.R.

210—406